United States Patent [19]

Nussstein et al.

[11] Patent Number: 5,360,899
[45] Date of Patent: Nov. 1, 1994

[54] CYCLODEXTRIN POLYMERS AND PROCESS FOR THEIR PREPARATION

[75] Inventors: Peter Nussstein; Guenther Staudinger, both of Munich; Wolfram Steinert, Burghausen; Franz-Heinrich Kreuzer, Martinsried; Wolfgang Schmitt-Sody, Wolfratshausen, all of Germany

[73] Assignee: Consortium für elektrochemische Industrie GmbH, Munich, Germany

[21] Appl. No.: 927,433

[22] PCT Filed: Mar. 22, 1991

[86] PCT No.: PCT/EP91/00561
§ 371 Date: Sep. 25, 1992
§ 102(e) Date: Sep. 25, 1992

[87] PCT Pub. No.: WO91/14708
PCT Pub. Date: Oct. 3, 1991

[30] Foreign Application Priority Data

Mar. 27, 1990 [DE] Germany ............... 4009840

[51] Int. Cl.$^5$ .............. C08B 37/16; C08G 65/26; C08G 65/24; B01D 15/08
[52] U.S. Cl. .................. 536/4.1; 536/46; 536/103
[58] Field of Search ............ 536/103, 46, 4.1

[56] References Cited

U.S. PATENT DOCUMENTS

| | | | |
|---|---|---|---|
| 4,539,399 | 7/1984 | Armstrong | 536/103 |
| 4,582,900 | 12/1984 | Brandt et al. | 536/103 |
| 4,902,788 | 2/1990 | Zemel et al. | 536/103 |
| 4,958,015 | 9/1990 | Zemel et al. | 536/103 |
| 5,032,683 | 7/1991 | Dragner et al. | 536/103 |
| 5,075,432 | 12/1991 | Vanzo | 536/103 |

FOREIGN PATENT DOCUMENTS

| | | |
|---|---|---|
| 0146841 | 12/1984 | European Pat. Off. |
| 2927733 | 7/1979 | Germany. |
| 1106833 | 10/1987 | Japan. |
| 9101721 | 8/1990 | WIPO. |

OTHER PUBLICATIONS

J. Solms et al., Helv. Chem. Acta 48 /1965), 1225, "Harze mit Einschlusshohlräumen von Cyclodextrin-Struktur".
P. E. Shaw et al., J. Food Sci., vol. 48 (1983), 646, "Debittering Citrus Juices with beta-Cyclodextrin Polymer".
A. Ujhazy et al., Gordian 89(3), (1989), 43, "Removal of Naringin from Aqueous Solution with Cyclodextrin Bead Polymer".
C.A. 110: 175437q, "Process for fixation of cyclodextrin in crosslinked polymers".
J. Szejtli, Cyclodextrin Technology (Kluwer Academic Publishers) 1988, 59.
C.A. 111: 194297f, "Recovery of 4-nitrophenol as sodium 4-nitrophenate from aqueous solutions".

*Primary Examiner*—Nathan M. Nutter
*Attorney, Agent, or Firm*—Collard & Roe

[57] ABSTRACT

Hydrophilic, water-dilatable cyclodextrin polymerizates have a high cyclodextrin content and possess good mechanical properties. The cyclodextrin pearl polymerizates are produced by reacting hydroxyalkyl cyclodextrin derivatives with bifunctional crosslinking agents such as epichlorohydrin or diepoxides, followed by hydroxyalkylation of the primary product so obtained. The cyclodextrin polymerizates produced in this manner have mechanical properties appreciably superior to those of known, comparable cyclodextrin polymers.

6 Claims, 1 Drawing Sheet

CYCLODEXTRIN POLYMERS AND PROCESS FOR THEIR PREPARATION

The invention relates to hydrophilic cyclodextrin polymers which are swellable in water and have a high cyclodextrin content, and a process for their preparation.

Cyclodextrins are cyclic, non-reducing oligosaccharides, consisting of α-D-glucose units which have exclusively 1,4-glucoside links. Currently α-, β- and γ-cyclodextrin, which are built up from 6, 7 and 8 anhydroglucose units respectively, are available in relatively large amounts. The most interesting property of the cyclodextrins is their ability to form inclusion complexes (host/guest compounds). In these compounds hydrophobic guest molecules of suitable size are enclosed in the cyclodextrin cavity and reversibly bonded by hydrophobic interactions, van der Waals forces and, in some cases, also hydrogen bridge bonds. By far the majority of applications of cyclodextrins are also based on the formation of these inclusion complexes. Thus, for example, they are suitable for chromatographic separations, as catalysts, as stabilizers, for solubilization or for converting liquid substances into the solid aggregate state.

Since, because of their chiral C atoms, cyclodextrins are able to act as enantion-selective receptors, chromatographic separations of suitable enantiomers are also possible with the participation of cyclodextrin inclusion compounds. As a result of these selective receptor characteristics, the stereoselectivity of chemical reactions can also be increased by cyclodextrins. However, if dissolved cyclodextrin is used as separating agent or extractant or as a catalyst, the separation of the inclusion compound from the system and the liberation of the included compound from the cyclodextrin are difficult. Therefore, an immobilization of cyclodextrins with maintenance of their inclusion capacity is advantageous. Immobilized cyclodextrins can be used, for example, as the stationary phase in separation processes in chromatography. Hitherto, an immobilization of cyclodextrins has been attempted in very diverse ways. However, all previously described immobilization methods have defects.

Insoluble (immobilized) cyclodextrins and their use in separation, processes have already been described by Solms and Egli (Helv. Chim. Actra 48, 1225 (1965)). In German Patent Specification DE 29 27 733, J. Szejtli et al. describe cyclodextrin-polyvinyl alcohol polymers and a process for their preparation. Compared with the cyclodextrin gels known hitherto, these have somewhat improved mechanical properties.

In J. Food Sci. 48, 646, (1983), P. E. Shaw and C. W. Wilson describe the use of such cyclodextrin polymers for separating bitter substances from citrus juices.

In Gordian 89 (3), 43 (1989) A. Ujhazy and J. Szejtli also describe the separation of a bitter substance (naringin) from aqueous solutions with the aid of a cyclodextrin bead polymer.

In the case of the already known cyclodextrin gels which have been mentioned, the immobilization of the cyclodextrins is achieved by bifunctional crosslinking agent units. A three-dimensional, hydrophilic cyclodextrin lattice which is swellable in water is formed. Material in bead form can be obtained by means of a method related to inverse suspension polymerization. The crosslinking agent units used are preferably epichlorohydrin or diepoxy compounds. However, all the cyclodextrin polymers prepared in this way which have been described hitherto are unsuitable for packing columns which are operated under a pressure distinctly higher than atmospheric pressure, since even under a pressure of 3 bar there is already a deformation of the packing such that the flow rates through a packed column are low. Even when the pressure is increased, the flow rates do not increase substantially because of the softness of the material. High flow rates are, however, desirable on economic grounds. Furthermore, by increasing the pressure for a given column packing material an increase in the separation efficiency can also be achieved.

In order to obtain a cyclodextrin-containing material which is suitable as column packing material for higher pressures, another process has also been proposed in which, in contrast to the proposal already mentioned, cyclodextrin molecules are bonded directly or via a spacer to a pressure-stable parent polymer in bead form.

In U.S. Pat. No. 4,539,399 D. W. Armstrong describes the fixing of cyclodextrins on silica gel as support material with the aid of linking reagents such as, for example, 3-glycidoxypropyltrimethoxysilane. The decisive disadvantage of these materials is their low cyclodextrin content. Thus, although these products are suitable for analytical purposes, they are, however, completely unsuitable for preparative use because of their low capacity.

In Japanese Patent Application 63 314 201 (CA 110 (1989): 175 437 q) the immobilization of cyclodextrins by fixing on a copolymer which consists of a glycidyl monovinyl ester (for example glycidyl methacrylate) or a glycidyl monovinyl ether (for example allyl glycidyl ether) and ethylene glycol dimethacrylate is described. In this procedure the fixing of the cyclodextrins is effected by treatment of the copolymer with HCl, during which treatment the epoxide rings of the glycidyl radical are opened, and subsequent reaction of this intermediate with a basic cyclodextrin solution. However, materials prepared in this way have several shortcomings. In addition to their low cyclodextrin content, the immobilization yield with respect to β-cyclodextrin is also low. In addition, the high proportion of relatively hydrophobic carrier polymer is a decisive disadvantage. This high proportion of hydrophobic sites outside the cyclodextrin cavities leads to unselective adsorptions of hydrophobic substances from the solution to be treated. The result of this is that, on desorption or elution, these unselectively adsorbed substances are mixed with those which were selectively bound to cyclodextrin units.

In "Cyclodextrin Technology" (Kluwer Academic Publishers) 1988, p. 59 et seq., J. Szejtli gives a comprehensive review of the attempts described hitherto to immobilize cyclodextrins. However, all of these attempts to prepare materials which are swellable in water resulted in products which either have only a moderate mechanical stability or have a low cyclodextrin content. In some cases, the preparation process is additionally so difficult and expensive that industrial utilization appears to be precluded.

In JP-A 1-106833 crosslinked cyclodextrins and hydroxyalkylcyclodextrins, respectively, are described and crosslinked cyclodextrins, which subsequently are reacted with ethylene oxide or propylene oxide, are described. These compounds are used as catalysts in the preparation of phenol derivatives.

WO-A1 9101721 relates to the crosslinking of unsubstituted cyclodextrin and the use of the reaction products as column packing material. However, these products have an unsatisfactory stability to pressure.

The object of the invention was to develop cyclodextrin polymers which are simple to prepare and which, with a high cyclodextrin content, at the same time possess improved mechanical properties compared with the comparable polymers already known. The novel water-insoluble polymers should also be hydrophilic and thus swellable in water. In this context, the term "water-insoluble" is to be understood to mean that, at room temperature, that is to say about 20° C., the polymers are soluble in water to the extent of less than 0.1% by weight.

The invention relates to water-insoluble crosslinked hydroxyalkylcyclodextrin polymers which are substituted by free $C_2$-$C_4$-hydroxyalkyl units. In a preferred embodiment, the crosslinked hydroxyalkylcyclodextrin polymers are subsequently substituted by free hydroxypropyl units.

The procedure for the preparation of these crosslinked hydroxyalkylcyclodextrin polymers is that hydroxyalkylcyclodextrin derivatives are crosslinked with bifunctional crosslinking agents and the polymer thus formed is hydroxyalkylated using alkylene oxides.

The hydroxyalkylcyclodextrins employed are usually obtained by reacting the particular cyclodextrins ($\alpha$-,$\beta$- or $\gamma$-cyclodextrin) with an alkylene oxide in a basic aqueous medium. The resulting product mixtures consisting of a multiplicity of cyclodextrin units having different substituents, are usually characterized with the aid of an MS value (degree of molar substitution). The MS value indicates how many alkylene oxide molecules are bounded on average per anhydroglucose unit of a cyclodextrin molecule. Since in the case of the reaction of the cyclodextrins with alkylene oxides in each case new OH groups are produced in the substituent, which groups are, in turn, able to react with alkylene oxide molecules, in principle MS values higher than 3 are also possible.

The hydroxyalkylcyclodextrins are used in the form of such product mixtures. The MS values can be determined with the aid of $^1$H NMR spectroscopy by simple comparison of the corresponding signal areas of cyclodextrin signals and substituent signals. Hydroxyalkylcyclodextrins having mean MS values of 0.1-2, preferably 0.4-1.5 and in particular 0.8-1.2 are suitable as educts for the bead polymers according to the invention. Particularly suitable hydroxyalkylcyclodextrins are hydroxyethyl- and hydroxypropylcyclodextrins.

The procedure for the preparation of the cyclodextrin bead polymers is that the hydroxyalkylcyclodextrin derivatives are crosslinked using polyvalent, for example bifunctional, reactive compounds. Compounds which can be used are epoxy compounds, such as, for example, epichlorohydrin, or diepoxy compounds, such as, for example, ethylene glycol diglycidyl ether. The ratio, in parts by weight, of hydroxyalkylcyclodextrin-/epoxy compounds is between 2:1 and 1:2. The resulting polyethers are relatively stable both in an acid and in an alkaline medium.

The reagent used for crosslinkings of this type is usually an alkaline aqueous solution of alkali metal hydroxides, in particular aqueous sodium hydroxide solution. The suitable alkali concentration depends on the particular crosslinking agent used and is between 5 and 40%; when epichlorohydrin is used it is preferably 10-20%. To form a bead polymer, the alkaline aqueous solution of a hydroxyalkylcyclodextrin ($\alpha$-, $\beta$- or $\gamma$-cyclodextrin derivative) is dispersed, with stirring, in a dispersing agent which is not completely miscible with this reagent, preferably an aliphatic or aromatic hydrocarbon, for example n-decane or toluene. The proportion of the aqueous phase in the two-phase system is between 15 and 50% by weight. In order to form stable two-phase systems, which also lead to bead polymers having a narrow particle size distribution, it is necessary to use emulsifiers. Emulsifiers used are preferably ethoxylated phosphoric acid esters, in particular ethoxylated phosphoric acid esters having an aromatic end group. Based on the hydrocarbon phase, the amount of emulsifier is 0.5 to 5.0% by weight, preferably 0.5-1.5% by weight.

The hydroxyalkylcyclodextrin concentration in the aqueous reaction phase is more suitably 20-60% (w/w), preferably 25-40%.

The polymerization is carried out at temperatures between 30° and 100° C. The polymer is filtered off, washed and dried.

For subsequent introduction of the hydroxyalkyl group the polymer is reacted in a basic aqueous reaction medium with 10 to 50 % by weight of alkylene oxide, based on the bead polymer. Propylene oxide is preferably used.

A suitable reaction medium is, in particular, sodium hydroxide solution and in a preferred embodiment the polymer is pre-swollen with 0.1-20% strength sodium hydroxide solution for 30-120 min, in order then to be reacted with the alkylene oxide at 50°-100° C. under a slight overpressure of at most 0.5 bar. The polymer is filtered off, washed and dried. The particle shape and size of the dry polymer hardly change during these operations.

Surprisingly, the cyclodextrin bead polymers prepared in this way have clearly better mechanical properties than comparable (same particle size, same water retention capacity, same gel bed volume) cyclodextrin polymers known hitherto. The reason for this unexpected rise in the stability to pressure lies in the use of hydroxyalkylcyclodextrins instead of unsubstituted cyclodextrins and in the adaptation of a conventional crosslinking system to the particular requirements of the present reaction, in particular with respect to the emulsifier system.

The cyclodextrin bead polymers according to the invention are suitable as column packing material for chromatographic separations of dissolved substances, as catalysts or for the selective removal of hydrophobic substances from aqueous solutions.

Figure 1:
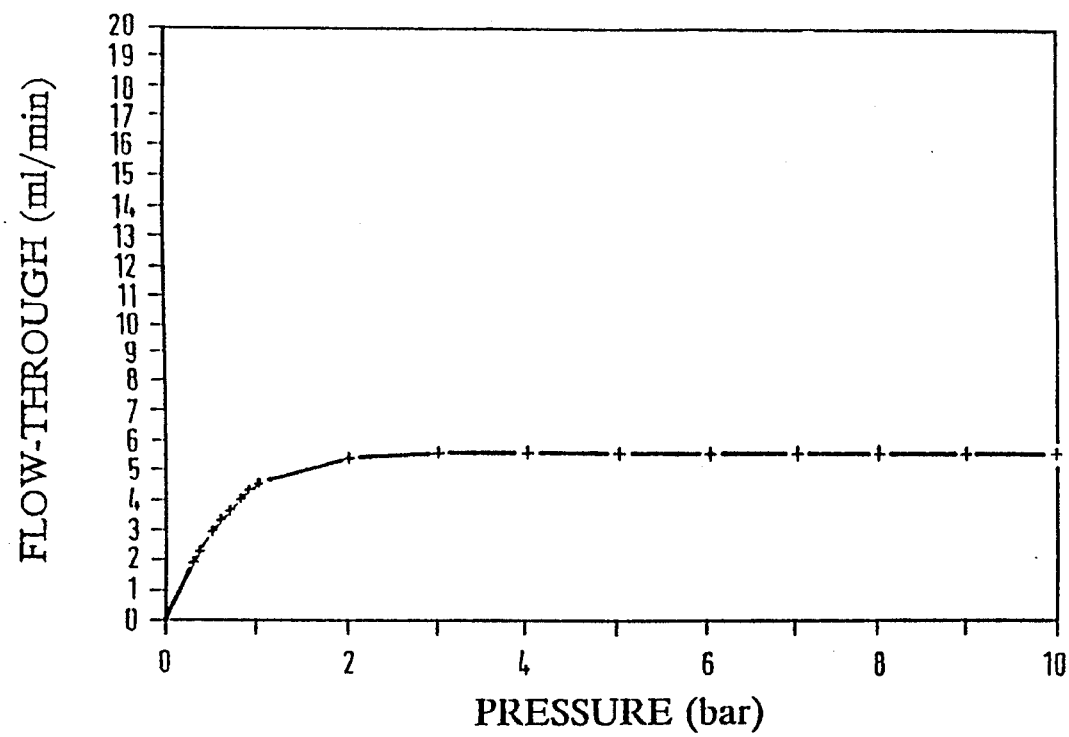
FIG. 1 shows the flow rate for a cyclodextrin polymer described in the prior art.
Figure 2:
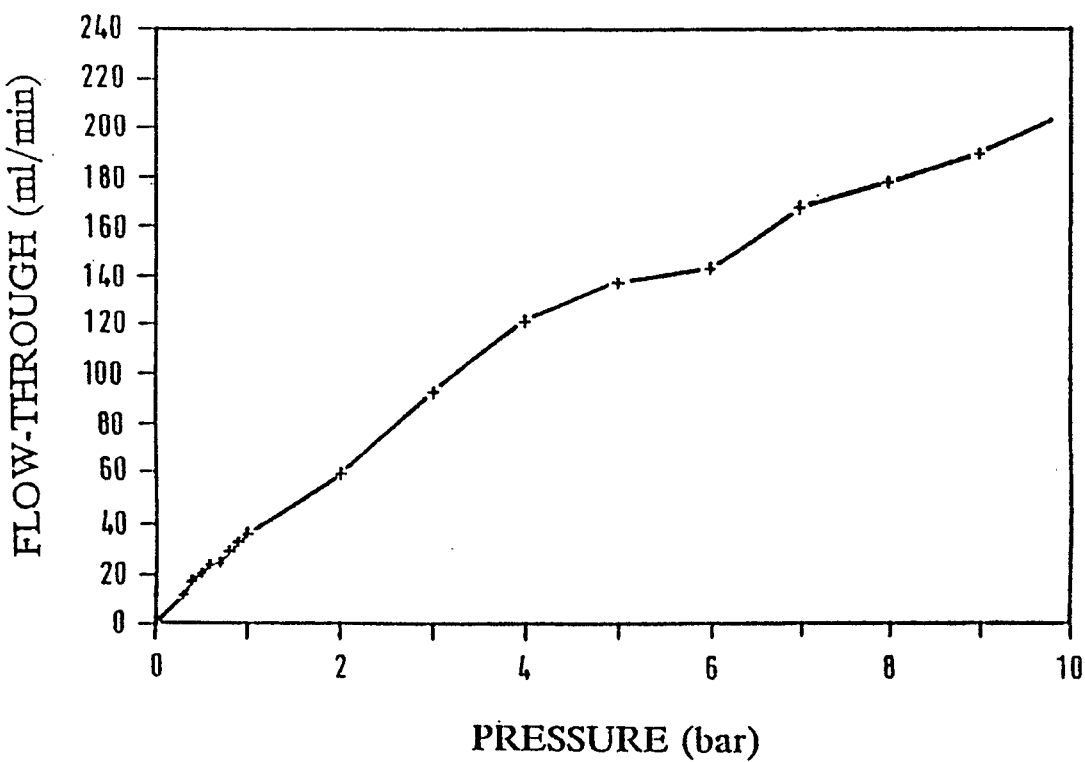
FIG. 2 shows the flow rate for a polymer according to Example 2 of the invention.

The following examples serve to further illustrate the invention:

EXAMPLE 1

Preparation of hydroxyethyl-$\beta$-cyclodextrin bead polymer 287 g of dry hydroxyethyl-$\beta$-cyclodextrin (MS=1.0) were dissolved in 510 g of 16% strength sodium hydroxide solution (w/w) and 91 g of epichlorohydrin were added at 80° C. in the course of 30 min, with stirring, the temperature of the exothermic reaction being kept at 80° C. by removing heat. After the addition of the epichlorohydrin was complete, the reaction mixture was stirred for a further 1 h at 80° C. and 115 g of 40 % strength sodium hydroxide solution were then added.

The solution of a hydroxyethylcyclodextrin oligomer obtained in this way was then thermostatically controlled at 50° C. and then added, with stirring, to a hot solution, at 50° C., consisting of 7.5 g of the dispersing agent "Gafac RM 510" (ethoxylated phosphoric acid esters having an aromatic end group) from GAF (Deutschland) GmbH, 5020 Frechen (complex phosphoric acid ester) in 805 ml of n-decane. After emulsifying the hydroxyethylcyclodextrin oligomer solution for 15 minutes, 144 g of epichlorohydrin were added rapidly. For final crosslinking, the mixture was then stirred for a further 3 h at 60° C. After completion of the reaction and cooling to room temperature, the bead polymer was filtered off and washed with 150 ml of n-decane, 500 ml of water, 500 ml of cold 0.2N hydrochloric acid and then distilled water until the filtrate was neutral and chloride-free. After drying at 70° C. and a pressure of 100 mbar, 399 g of product in bead form resulted. The average particle size of the dry bead polymer was 150 μm, the swelling in water was 2.1 g/g and the gel bed volume in water was 4.0 ml/g. In order to determine the stability of the resulting cyclodextrin gel to pressure, the flow rate of water through a column filled with the gel (fill height: 30 cm, diameter: 2.5 cm) was measured. The flow rate was 65 ml/min at a pressure of 10 bar.

EXAMPLE 2

Hydroxypropylation of hydroxyethyl-β-cyclodextrin polymer 100 g of the hydroxyethyl-β-cyclodextrin polymer described in Example 1 were swollen in 300 g of 10% strength sodium hydroxide solution (w/w) for 1 hour in a closed apparatus provided with a stirrer, a reflux condenser and a dropping funnel, 270 g of water were then added and the mixture was heated to 90° C. with stirring. 41.5 g of propylene oxide were then added dropwise at a uniform rate in the course of 75 min and the reaction mixture was stirred for a further hour at 90° C., the excess pressure, which was slight at the start, decreasing during the reaction. After completion of the reaction, the reaction mixture was cooled and the polymer was filtered off and washed with 100 ml of distilled water, 50 ml of 0.2N hydrochloric acid and a further 500 ml of distilled water until the filtrate was chloride-free and had a neutral pH value. After drying at 70° C. under a pressure of 100 mbar to constant weight, 110 g of polymer were obtained.

The average particle size of the dry hydroxypropylated cyclodextrin polymer prepared in this way was unchanged at about 150 μm. The swelling in water was 1.3 g/g and the gel bed volume 3.1 ml/g. The flow rate (determination as described in Example 1) was 200 ml/min under a pressure of 10 bar.

EXAMPLE 3

Preparation of hydroxypropyl-β-cyclodextrin bead polymer

Hydroxypropyl-β-cyclodextrin bead polymer was prepared as described in Example 1, a hydroxypropyl-β-cyclodextrin (MS=1.0) being used in place of hydroxyethyl-β-cyclodextrin (MS=1.0). 385 g of polymer in bead form having an average particle diameter of 150 μm were obtained. The swelling in water was 2.1 g/g and the gel bed volume 4.0 ml/g. The flow rate was 45 ml/min under a pressure of 10 bar.

EXAMPLE 4

Hydroxypropylation of hydroxypropyl-β-cyclodextrin polymer 100 g of a hydroxypropyl-β-cyclodextrin polymer prepared as in Example 3 were reacted with 41.5 g of propylene oxide in the manner described in Example 2. 115 g of a polymer having an average particle diameter of 155 μm resulted. The swelling in water was 1.1 g/g and the gel bed volume 3.3 ml/g. The flow rate was 140 ml/min under a pressure of 10 bar.

EXAMPLE 5

Preparation of hydroxyethyl-α-cyclodextrin polymer

Hydroxyethyl-α-cyclodextrin bead polymer was prepared as described in Example 1, a hydroxyethyl-α-cyclodextrin (MS=1.0) being used in place of hydroxyethyl-β-cyclodextrin (MS=1.0). 370 g of a polymer in bead form having an average particle diameter of 140 μm resulted. The swelling in water was 2.3 g/g and the gel bed volume 4.2 ml/g. The flow rate was 50 ml/min under a pressure of 10 bar.

EXAMPLE 6

Hydroxypropylation of hydroxyethyl-α-cyclodextrin polymer 100 g of a hydroxyethyl-α-cyclodextrin polymer prepared as in Example 5 were reacted with 41.5 g of propylene oxide in the manner described in Example 2. 113 g of a polymer having an average particle diameter of 140 μm resulted. The swelling in water was 130 ml/min under a pressure of 10 bar.

EXAMPLE 7

Preparation of hydroxyethyl-γ-cyclodextrin polymer

Hydroxyethyl-γ-cyclodextrin bead polymer was prepared as described in Example 1, a hydroxyethyl-γ-cyclodextrin (MS=1.0) being used in place of hydroxyethyl-β-cyclodextrin (MS=1.0). 390 g of a polymer in bead form having an average particle diameter of 160 μm resulted. The swelling in water was 2.1 g/g and the gel bed volume 3.9 ml/g. The flow rate was 40 ml/min under a pressure of 10 bar.

EXAMPLE 8

Hydroxypropylation of hydroxyethyl-γ-cyclodextrin polymer 100 g of a hydroxyethyl-γ-cyclodextrin polymer prepared as in Example 7 were reacted with 41.5 g of propylene oxide in the manner described in Example 2. 115 g of a polymer having an average particle diameter of 160 μm resulted. The swelling in water was 1.4 g/g and the gel bed volume 3.4 ml/g. The flow rate was 150 ml/min under a pressure of 10 bar.

To determine the mechanical properties, the flow rate of water through a column packed with cyclodextrin polymer was measured as a function of the pressure. The diameter of the column was 2.5 cm and the packed height of the cyclodextrin polymer pre-swollen in water was 30 cm. In order to ensure that the flow rate cannot be affected by small particles, which could block the interstitial volume, particles having a diameter of <50

μm were separated off from the tested polymer by sieving and sedimentation. This fine fraction is usually less than 1% of the weight for an average particle size of about 150 μm.

In these pressure tests it was found that, for example, the cyclodextrin polymers described by J. Szejtli in DE 29 27 733, which already had improved mechanical properties compared with previously known similar polymers, already have their maximumflow rate at a pressure of less than 3 bar. There is no further increase in this flow rate with further increasing pressure. The cyclodextrin polymers according to the invention, on the other hand, show a continuous rise in the flow rate with increasing pressure up to about 10 bar. Under a pressure of 10 bar, the absolute flow rates of the bead polymers according to the invention are, moreover, distinctly higher than in the case of the polymers prepared in accordance with DE 29 27 733. In these tests, bead polymers of the same diameter, and also the same water retention capacity (swelling) and gel bed volume, were always compared with one another.

FIG. 1:

Flow rate for an epichlorohydrin-crosslinked β-cyclodextrin polymer prepared in accordance with DE 29 27 733 (swelling 1.5 g/g; gel bed volume 3.2 ml/g; average particle size 150 μm).

FIG. 2:

Flow rate of the bead polymer according to Example 2 (swelling 1.3 g/g; gel bed volume 3.1 ml/g; average particle size 150 μm).

We claim:

1. A crosslinked, water-insoluble hydroxyalkylcyclodextrin polymer substituted by free $C_2$- to $C_4$-hydroxyalkyl units.

2. The water-insoluble hydroxyalkylcyclodextrin polymer as claimed in claim 1, which is substituted by free hydroxypropyl groups.

3. A process for the preparation of a crosslinked, water-insoluble hydroxyalkylcyclodextrin polymer substituted by free $C_2$-$C_4$-hydroxyalkyl units, which comprises
   crosslinking hydroxyalkylcyclodextrin using a polyvalent crosslinking agent in a two-phase reaction medium comprising an alkaline aqueous phase and a hydrocarbon phase, in the presence of 0.5 to 5.0% by weight of ethyoxylated phosphoric acid ester, based on the hydrocarbon phase; and
   reacting the polymer in said alkaline aqueous reaction medium with 10% to 50% by weight of alkylene oxide, based on the weight of the polymer, at 50° C. to 100° C.

4. The process as claimed in claim 3, wherein a hydroxyalkyl derivative of α-cyclodextrin, β-cyclodextrin or γ-cyclodextrin is used.

5. The process as claimed in claim 4, wherein hydroxyethylcyclodextrin or hydroxypropylcyclodextrin is used.

6. The process as claimed in claim 3, wherein the degree of molar substitution of the hydroxyethylcyclodextrin or hydroxypropylcyclodextrin is between 0.1 and 2.0.

* * * * *